W. E. & F. E. VAN HORN.
PUSH OR BUCK RAKE.
APPLICATION FILED DEC. 30, 1908.
936,197.
Patented Oct. 5, 1909.
3 SHEETS—SHEET 3.
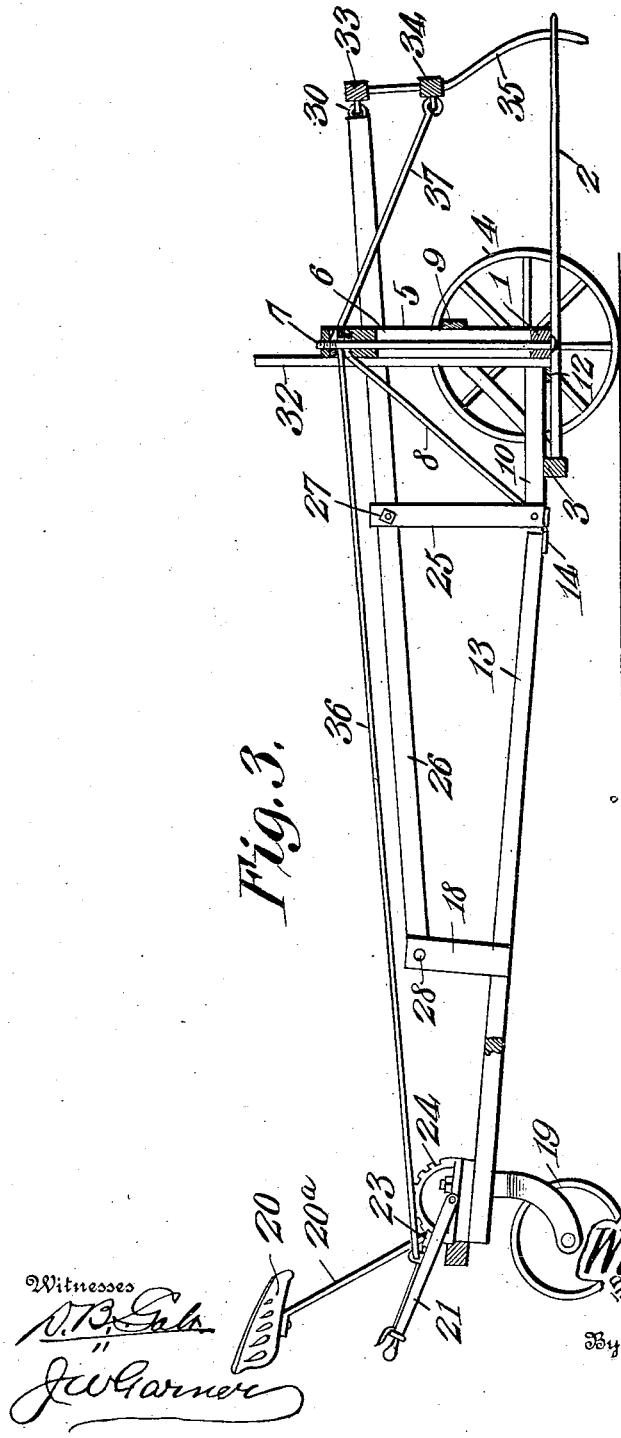
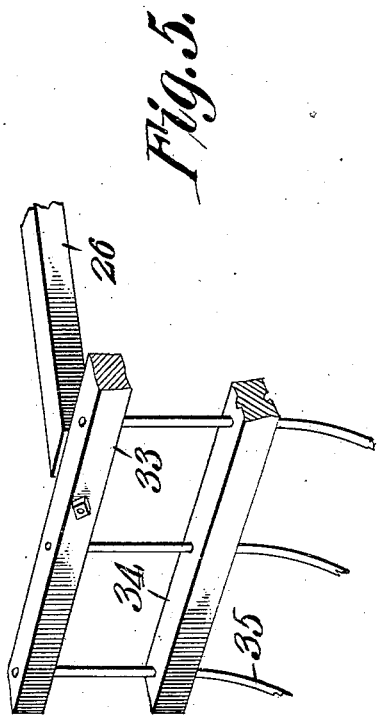

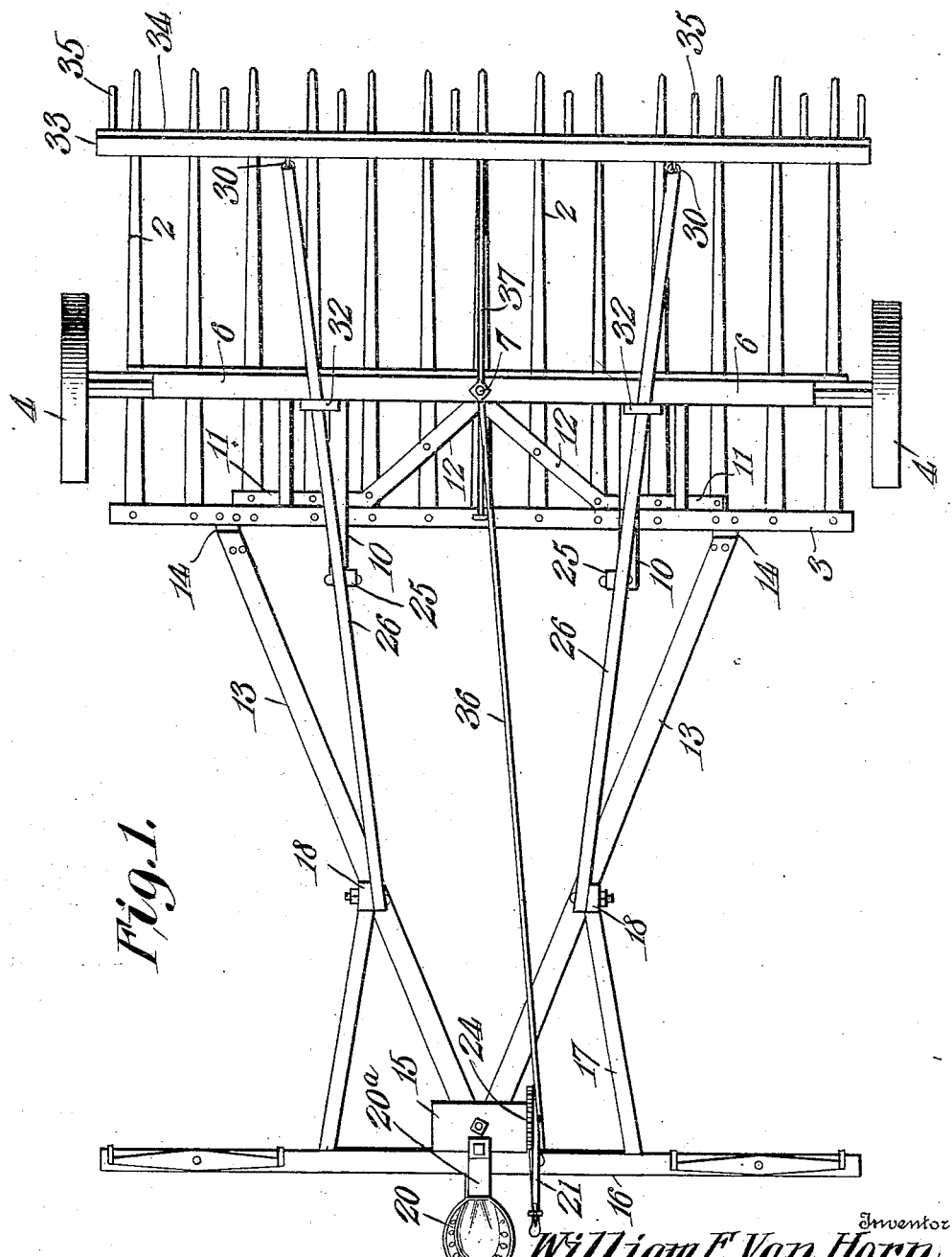

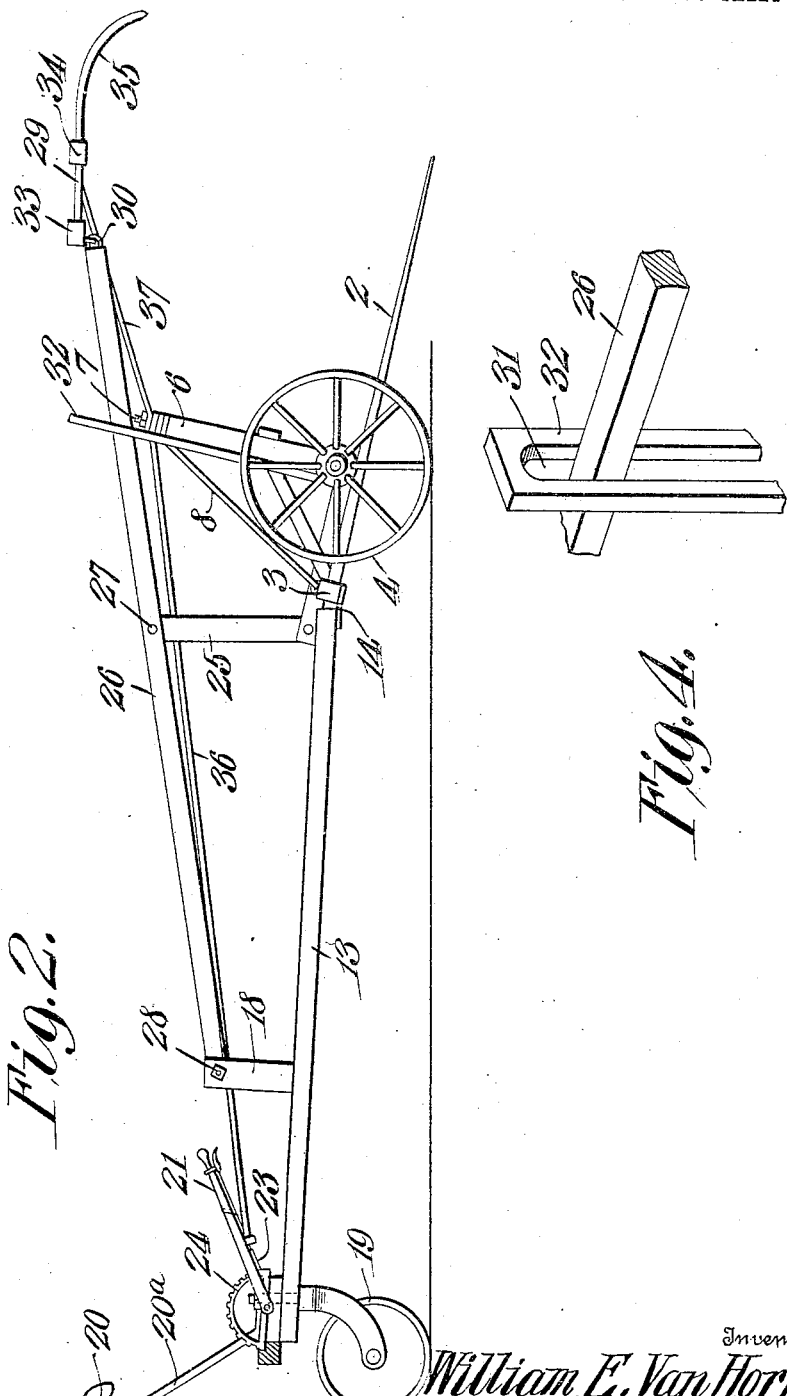

NITED STATES PATENT OFFICE.

WILLIAM E. VAN HORN AND FRED E. VAN HORN, OF EL CENTRO, CALIFORNIA.

PUSH OR BUCK RAKE.

936,197.

Specification of Letters Patent.   Patented Oct. 5, 1909.

Application filed December 30, 1908. Serial No. 470,117.

*To all whom it may concern:*

Be it known that we, WILLIAM E. VAN HORN and FRED E. VAN HORN, citizens of the United States, residing at El Centro, in the county of Imperial and State of California, have invented new and useful Improvements in Push or Buck Rakes, of which the following is a specification.

This invention is an improved push or "buck" rake, the object of the invention being to provide a rake of this character with a fender to prevent the hay or straw from dropping from the rake teeth of the rake head while the rake is moving over the ground and with means for operating said fender, and the said invention consists in the construction, combination and arrangement of devices hereinafter described and claimed.

In the accompanying drawings:—Figure 1 is a plan of a push or buck rake constructed in accordance with this invention. Fig. 2 is an elevation of the same showing the points of the rake teeth lowered and the fender raised as when the rake is taking on or discharging a load. Fig. 3 is a longitudinal sectional view of the same showing the point of the rake teeth raised and the fender lowered as when the rake is loaded and is in condition for being moved from one point to another. Fig. 4 is a detail perspective view showing a portion of one of the fender supporting bars and the guide standard for said bar. Fig. 5 is a detail perspective view showing a portion of the fender.

The rake head consists essentially of the axle 1, the rake teeth 2 and the cross bar 3 at the rear end of the rake teeth, the latter being secured also to the under side of the axle and the said axle being disposed at a suitable distance in advance of the cross bar. The supporting wheels 4 are mounted on the spindles of the axle at opposite sides of the rake head and hence the latter is pivotally mounted so that it may be moved to dispose the rake teeth either in a horizontal position or in an inclined position. The rake teeth, as is usual in rakes of this class, have their points lowered when taking on or discharging a load and are disposed in a horizontal position when carrying the load from one point to another. On the axle is a truss 5 which also forms means to prevent the load from moving rearwardly on the rake head. The said truss consists essentially of a pair of inclined bars 6 and a vertically disposed rod 7 which extends forwardly from the center of the axle and through the upper meeting ends of said inclined bars. A brace rod 8, which is inclined, connects the cross bar 3 and the truss rod 7 and is attached to the latter near the upper end thereof. A horizontally disposed cross bar 9 is secured to the inclined bars 5 on their front sides and at a suitable distance above the rake teeth. A pair of inwardly extending bars 10 are secured on the axle and the cross bar 3 and project rearwardly a suitable distance from the rake head. Tie bars 11 of suitable length are secured on certain of the rake teeth and brace bars 12 connect said tie bars with the center of the axle.

A push element is, as is usual, in rear of and pivotally connected to the said rake head. Within the scope of our invention, the push element may be of any suitable construction. It is here shown as comprising essentially a pair of forwardly diverging push bars 13 connected together at their rear ends and having their front ends hinged to the rear end of the rake head as at 14, a cross block 15 secured on the rear ends of said push bars, a cross bar 16 at the rear ends of the push bars and braces 17 which connect the said cross bar 16 and the said push bars. The ends of the said cross bar extend beyond the said side braces and standards 18 which are vertically disposed are secured to the said push bars. Caster wheel 19 supports the rear end of the said push element. A seat 20 has its supporting bar or spring 20ª secured on the said cross block 15. A hand lever 21 is mounted on the cross block 15 and has a dog 23 which by coaction with a tooth sector 24 secures the said lever in any desired position. A pair of links 25 have their lower ends pivotally connected to the rear ends of the rearwardly extending bars 10. A pair of longitudinally disposed supporting bars 26 have their intermediate portions pivotally connected to the upper ends of the said links as at 27, and their rear ends pivotally connected to the upper ends of the standards 18, as at 28. Said supporting bars extend forwardly over the rake teeth and to their front ends is pivotally connected a fender 29, as at 30. The said supporting bars extend through and are movable vertically in vertical guide slots 31 of a pair of guide standards 32 with which the rake head is provided, the said guide standards being secured to the rear sides of the axle and the truss bar 6 of the rake head.

The fender 29 comprises a pair of bars 33, 34 and a series of fender teeth 35 which connect the said bars together, one of said bars being at the upper ends of the said teeth and the other being at a suitable distance below the upper ends thereof. Within the scope of our invention, the said fender may be of any suitable construction and we do not desire to limit ourselves in this particular. A tilting rod 36 connects the tilting lever 21 to the rake head and an operating rod 37 connects the rake head to the fender. The said rods are here shown as each having one end connected to the truss rod 7.

The operation of our invention is as follows: When the hand lever 21 is turned in one direction it causes the rod 36 to draw the truss which forms the upper extension of the rake head rearwardly so as to dispose the rake teeth in a horizontal position, and cause the rod 37 which moves rearwardly with the upper extension and truss of the rake head to turn the fender downwardly to nearly a vertical position so that the teeth of the fender are disposed between and at the front ends of the rake teeth. The downward movement of the rear portion of the rake head causes the links 25 to move downward and said links being, as hereinbefore described, pivotally connected to the supporting bars 26, the free ends of said supporting bars are also lowered thereby causing the fender to descend to the required extent to dispose it with maximum effect at the outer end of the rake head. It will be understood that when the rake head and the fender are in this position, shown in Fig. 3, a load on the rake head will be securely kept thereon and any portion of it will be prevented from being spilled over the front ends of the rake teeth while the rake is in motion across the field. When the hand lever 21 is moved in the required position to lower the front ends of the rake teeth, as in Fig. 2, for the purpose of loading or discharging the load from the rake, the rod 37 will move forwardly and cause the fender to be turned upwardly to a substantially horizontal position as shown in Fig. 2, so that the fender gets entirely out of the way and offers no obstruction either to the loading or unloading of the rake head. It will also be understood that as the front ends of the rake teeth become lowered their rear ends raise and the links 25 move upwardly so as to cause the supporting bars 26 to elevate the fender to a suitable height above the rake head.

Our improved rake with the fender and the means hereinbefore described for operating the fender possesses many points of advantage, especially in that the fender is very easily operated simultaneously with the rake head when the latter is to be loaded or unloaded and that the fender effectually prevents any part of the load from being spilled or wasted.

What is claimed is:—

1. In a push rake, the combination of a rake head having supporting wheels, a push element in rear of and pivotally connected to the rake head, supporting bars pivotally connected to the push element and extending forwardly over the rake head, connections between the rake head and the said supporting bars to raise the front ends of the latter when the points of the rake teeth are lowered, a fender above the rake teeth flexibly connected to and normally depending from the supporting bars, a tilting lever mounted on the push element and connections between said lever, said rake head and said fender for the purpose described.

2. In a push rake, the combination of a rake head mounted for tilting movement, a push element connected to the rake head, a fender disposed above the rake head and means to simultaneously operate the rake head and the fender.

3. In a push rake, the combination of a rake head mounted for tilting movement, a push element connected to the rake head, an operating lever mounted on the push element, supporting bars extending forwardly over the rake head, a fender connected to the said supporting bars for angular movement and connections between the rake head, the fender and the tilting lever, for the purposes set forth.

4. In a push rake, the combination of a rake head mounted for tilting movement, a push element in rear of and connected to the rake head, supporting bars connected to the push element and extending forwardly over the rake head, links connecting the rear portion of said rake head to the said supporting bars, a fender connected to said supporting bars for angular movement and a lever and connections for tilting the rake head and raising and lowering the fender.

In testimony whereof we affix our signatures in presence of two witnesses.

WILLIAM E. VAN HORN.
FRED E. VAN HORN.

Witnesses:
WILLARD F. GILLETT,
WILLIAM R. APPLEWHITE.